US006751780B1

(12) United States Patent
Neff et al.

(10) Patent No.: US 6,751,780 B1
(45) Date of Patent: Jun. 15, 2004

(54) USER INTERFACE FOR INITIATING THE EXPORT OF AN OPTIMIZED SCANNED DOCUMENT USING DRAG AND DROP

(75) Inventors: Theodore W. Neff, Ft. Collins, CO (US); Jeffrey P. Lee, Greeley, CO (US); Patricia D. Lopez, Loveland, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 726 days.

(21) Appl. No.: 09/164,795

(22) Filed: Oct. 1, 1998

(51) Int. Cl.[7] .......................... G06F 17/30; G06F 7/00; G06K 9/72
(52) U.S. Cl. ................. 715/530; 715/526; 382/229; 358/1.18
(58) Field of Search ................. 707/530, 526; 358/1.19; 345/339, 349; 715/530, 526; 382/229

(56) References Cited

U.S. PATENT DOCUMENTS

| 5,596,655 A | | 1/1997 | Lopez .................... 382/173 |
| 5,732,230 A | * | 3/1998 | Cullen et al. ............. 345/339 |
| 5,872,569 A | * | 2/1999 | Salgado et al. ........... 345/349 |
| 5,907,665 A | * | 5/1999 | Sobol et al. .............. 358/1.19 |
| 5,960,448 A | * | 9/1999 | Reichek et al. ........... 707/526 |
| 6,011,553 A | * | 1/2000 | Komiyama ............... 345/349 |

OTHER PUBLICATIONS

PhotoImpact Version 3.0 User Guide, Ulead Systems, Inc. pp. 1–2, 72–77, 80, 152–153, 157, 161–163, 182, Jan. 1996.*

IBM ADF Color Scanner User's Guide, including screeshots of help files, IBM Corporation pp. 1–40, Jul. 1995.*

Theo Pavlidis and Jiangying Zhou, "Page Segmentation and Classification," Document Image Analysis, pp 226–238, (Lawrence O'Gorman and Rangachar Kasturi, IEEE Press, 1995).

Anil K. Jain and Bin Yu, "Doucmentation Representation and Its Application to Page Decomposition," Pattern Analysis and Machine Intelligence, pp 294–308, (vol. 20, No. 3, Mar. 1998).

* cited by examiner

Primary Examiner—Joseph H. Feild
Assistant Examiner—William L. Bashore

(57) ABSTRACT

A user interface method for launching an optimized final scan of a selected region of interest selected from a preview scan of a document. A user may drag the selected region of interest, presented in a preview scan of a document in a scanner window, and drop it on a software application, the desktop, or a writeable folder, which launches an optimized final scan of the selected region of interest. The image data resulting from the optimized final scan automatically resides in the software application, the desktop, or the writeable folder. In selecting a region of interest from the preview scan, scanner software parameters are updated with information about the region of interest which optimize the final scan. The image data from the optimized final scan is then formatted in the format requested and delivered to the software application, the desktop, or the writeable folder.

20 Claims, 12 Drawing Sheets

USER INTERFACE FOR INITIATING THE EXPORT OF AN OPTIMIZED SCANNED DOCUMENT USING DRAG AND DROP

CROSS REFERENCE TO RELATED APPLICATIONS

This application is related to application Ser. No. 09/164,693 of Jeffrey P. Lee et al. filed Oct. 1, 1998 entitled Click and Select User Interface for Document Scanning.

TECHNICAL FIELD

This invention relates to document scanners and more particularly to the user interface for document scanners. Even more particularly, the invention relates to a user interface that allows a user to automatically select a region of interest from a preview scan of a document and initiate an optimized final scan of the region of interest by moving it to an application using the drag and drop feature of the Windows operating system.

BACKGROUND OF THE INVENTION

Current scanner technology allows a user to capture and utilize all or portions of various scanned documents, images, objects, etc. for use within various computer applications, even when the documents are comprised of a variety of different components. A document containing text, black and white and/or color photographs, graphics, and color and black and white line art can be scanned in its entirety. Alternatively, the user may choose to select only certain portions of the original document for scanning by utilizing scanner software to select an area or particular image contained in a preview scan of the document. The selected area is then scanned to produce a final image.

The usability of existing scanning software has been hindered by the inability of users to easily move images from the scanner software to the user desktop or desired application, such as word processing or an Adobe Photo-Shop™ image editing type application. Typically, scanning software forces the user to either save the image as a file, copy the image to the clipboard, or return the data via a TWAIN or other industry standard inter-application communication protocol initiated scan.

It is thus apparent that there is a need in the art for an improved method or apparatus which solves the objects of the invention. The present invention meets these and other needs in the art.

This application is related to application Ser. No. 09/164/693 of Jeffrey P. Lee et al. filed Oct. 1, 1998 entitled Click and Select User Interface for Document Scanning, which is incorporated herein by reference for all that is disclosed and taught therein.

DISCLOSURE OF THE INVENTION

It is an aspect of the present invention to click on a selected region in a preview scan of a document and drag it to an open application or a desktop to launch an optimized final scan of the selected region.

It is another aspect of the invention to have the image data resulting from the optimized final scan automatically reside in the open application or desktop.

Yet another aspect of the invention is to update scanner software control parameters with information about the selected region to optimize the final scan of the selected region.

Still another aspect of the invention is to offer different data formats for the optimized final scan based upon the selected region type.

A further aspect of the invention is to allow the open application to query the scanner software to determine if it can accept drop input of the selected region in an offered format before executing the optimized final scan.

A still further aspect of the invention is to format the data from the optimized final scan into the format requested by the open application.

The above and other aspects of the invention are accomplished in a user interface for scanner software that allows a preview scan of a document to be presented to the user in a variable resolution preview window in a computer monitor. The user may then click on a point within a region of interest in the preview scan data in the variable resolution preview window. Based on the characteristics of the data represented at the click point, an area is determined that encompasses the click point and the neighboring points that have similar characteristics to that of the click point. This area is then classified by type based on the characteristics of the data represented within the area, such as text, gray scale image, color image, or black and white image. A selection marker is then automatically displayed around the area as a first estimate of what the user intended by making the mouse click at the click point.

The selection marker may be a bounding box rectangular in shape. For non-rectangular "lasso" regions, image analysis software may be applied, automatically tracing around the lasso region of interest. Portions of the scanned document that lie outside the selection marker are grayed out. Based on the determination of the type of area, adjustments are made automatically to data type, exposure, color, resolution, and sharpness settings that normally would have to be made manually by the user in prior art systems.

If the selection marker automatically generated does not represent the image of interest desired by the user, the user can adjust the size of the region of interest to include more area or include less area in several different ways. One such way is by dragging the selection area handles appropriately, expanding or contracting the selected area. Or, the user may simultaneously click on a point and hold down a control key on a keyboard, to either expand the region or image of interest to include additional area, or contract the region or image of interest to exclude area already selected. The user may also right click on the mouse to pop up a context menu, and select an expand selection option or select a contract selection option from the menu. In addition, a different region of interest can be selected by the user by clicking in an unselected area of the variable resolution preview scan, and dragging the mouse to create a rectangular area bounded by a selection marker.

Based on the type of image, windows having tools for adjusting various aspects of the selected area are automatically enabled or disabled from user input. Once the region of interest is properly selected, and any adjustments have been made, the user can use a mouse to drag and drop the selected area onto the desktop, a writeable folder, or onto an open application to launch an optimized final scan, or re-scan, of the selected area. After the optimized final scan, the resulting image data resides in the desktop, folder, in a file, or within the open application. Alternatively, the user may utilize pull down menus or buttons to launch the optimized final scan. However, if the pull down menu is used, save to file, copy to clipboard, and print are the only options available. Thus, the resulting image data will not automatically appear in an open application utilizing this option.

DESCRIPTION OF THE DRAWINGS

The above and other aspects, features, and advantages of the invention will be better understood by reading the following more particular description of the invention, presented in conjunction with the following drawings, wherein.

BEST MODE FOR CARRYING OUT THE INVENTION

The following description is of the best presently contemplated mode of carrying out the present invention. This description is not to be taken in a limiting sense but is made merely for the purpose of describing the general principles of the invention. The scope of the invention should be determined by referencing the appended claims.

Figure 1:
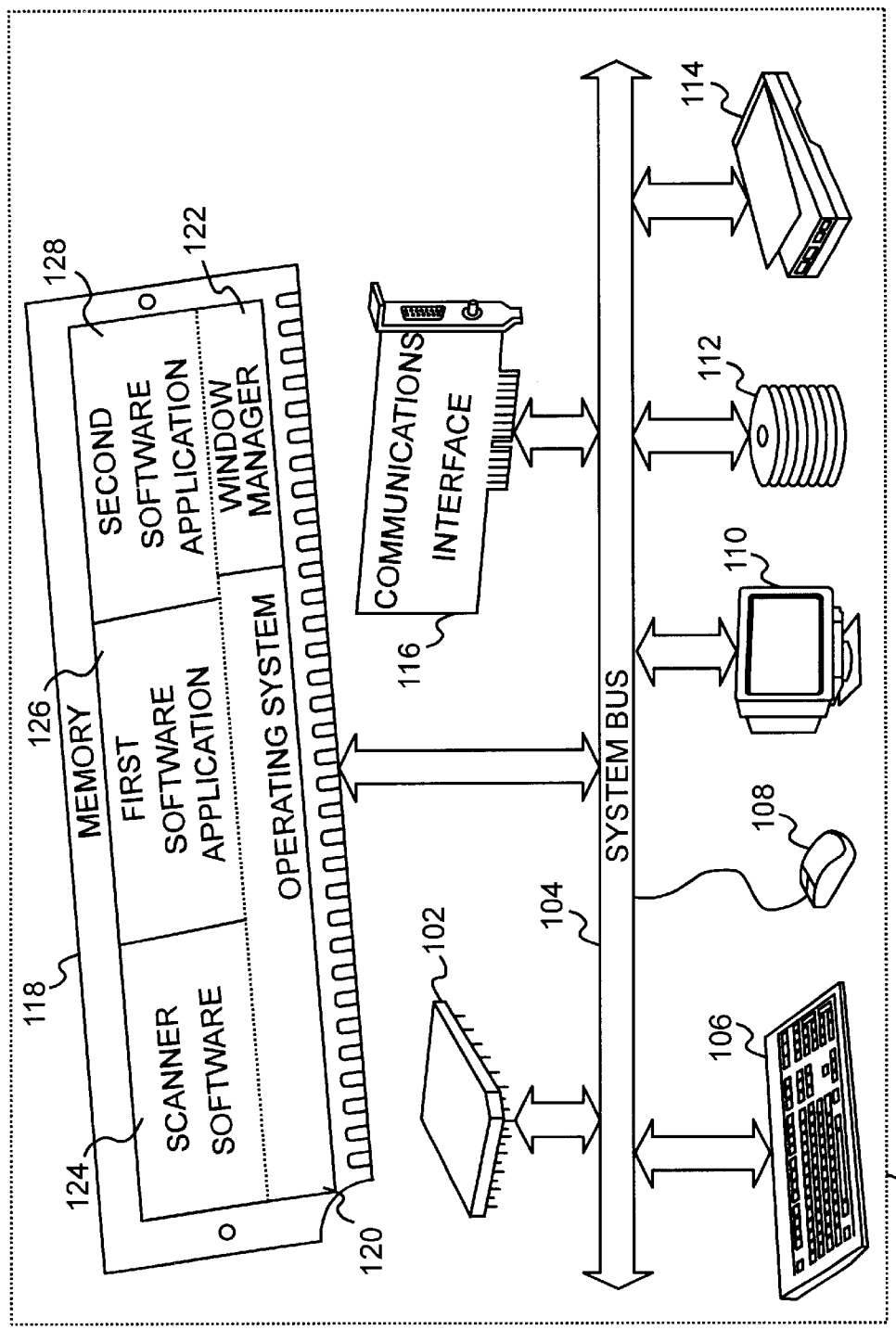
FIG. 1 shows a block diagram of a computer system incorporating the user interface for scanner software of the present invention.

FIG. 1 shows a block diagram of a computer system incorporating the user interface for scanner software of the present invention. One skilled in the art will recognize that many other configurations are possible for accessing a scanner with a computer system. Only one configuration is shown for simplicity. Referring now to FIG. 1, computer system 100 contains a processing element 102. Processing element 102 communicates with other elements of computer system 100 over a system bus 104. A keyboard 106 allows a user to input information into computer system 100 and a monitor 110 allows computer system 100 to output information to the user. A graphical input device 108, commonly a mouse, is also used to input information. Scanner device 114 is also used to input information to computer system 100.

Storage device 112 is used to store data and programs within computer system 100. Communications interface 116, also connected to system bus 104, receives information from sources outside of computer system 100. A memory 118, also attached to system bus 104, contains an operating system 120, window manager 122, and scanner software 124 having the user interface for scanner software of the present invention. In the preferred embodiment of the invention, operating system 120 is the Microsoft Windows® operating system. Memory 118 also contains first software application 126 and second software application 128. One skilled in the art will recognize that many more software applications could reside in memory 118. Only two are shown for simplicity.

Figure 2:
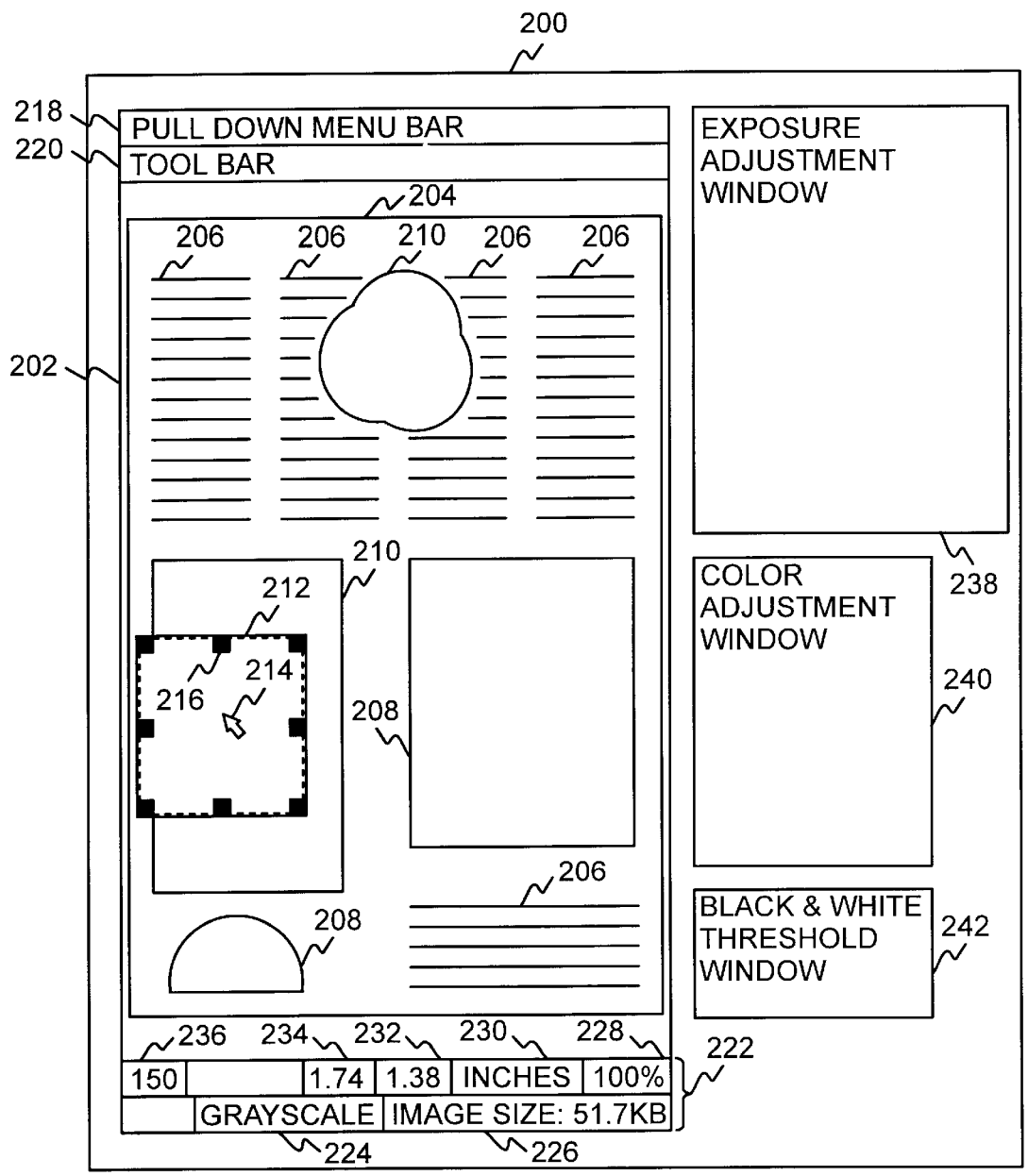
FIG. 2 shows a representation of the screen display of a computer monitor showing the user interface for scanner software of the present invention.

FIG. 2 shows a representation of the screen display from monitor 110 (FIG. 1) showing the user interface for scanner software 124 (FIG. 1) of the present invention. Referring now to FIG. 2, scanner software window 200 shows a variable resolution preview window 202 containing variable resolution preview scan 204 of a document that has been positioned on the flatbed of scanner device 114 (FIG. 1). A user initiates a variable resolution preview scan 204 by pressing a preview scan mode button on scanner device 114 (FIG. 1), or through a scan button or pull down menus presented to the user on monitor 110 through scanner software 124, which sends a signal causing scanner device 114 to use a preview scan mode to scan the document. A preview scan mode is typically a low resolution scan, dependent on the resolution of the display and the size of the preview window. A user may also initiate a zoom scan of an area of the document positioned on the flatbed, in which case the resolution of the data contained in variable resolution preview window 202 may be that of the scanner, which could be a considerably higher resolution than the preview scan mode. The data generated from the variable resolution preview scan is displayed as variable resolution preview scan 204 in variable resolution preview window 202. Variable resolution preview scan 204 shows regions of various types, including text regions 206, black and white line art regions 208, color photograph regions 210, and gray scale photograph region 212, which is partially superimposed on one of the color photograph regions 210.

A user has moved pointer 214 within gray scale photograph region 212 with graphical input device 108 (FIG. 1) and has subsequently clicked on graphical input device 108. Scanner software 124 receives the click input, with pointer 214 in the shown location, and determines a boundary for the region surrounding the click point, and what data type of region is within the boundary. Alternatively, a user can accomplish the above manually by moving pointer 214 to a corner of gray scale photograph region 212, and then clicking and dragging graphical input device 108 to encompass gray scale photograph region 212 and then manually setting the data type via a pull down menu. In either case, variable resolution preview window 202 is updated with selection marker 216 drawn around the region identified as gray scale photograph region 212. In this example, selection marker 216 is a rectangular bounding box. The rest of the area of variable resolution preview scan 204 outside of gray scale photograph region 212 is grayed out (not shown in FIG. 2).

Variable resolution preview window 202 also contains pull down menu bar 218 and tool bar 220, which provide the user with access to various functions of scanner software 124. If no region has been selected, status bar 222 displays information regarding variable resolution preview scan 204 in its entirety. If a region has been selected, as shown in FIG. 2, status bar 222 displays current information regarding the region selected, which in this example is gray scale photograph region 212. Box 224 indicates that the region selected is a gray scale photographic image. Box 226 indicates the image file size is 51.7 KB. A scaling factor of 100% is shown in box 228. A different scaling factor may be displayed if an inter-application communication link, such as TWAIN or OLE, has been established indicating a preferred final size of the region of interest, or if the user has specified one. Box 230 indicates that the selected image is measured in inches. The user may also make a "units" preference for Box 230 other than inches, such as centimeters, points, or pixels. Box 232 indicates that the selected image is 1.38 inches high, and box 234 indicates that the selected image is 1.74 inches wide. Box 236 indicates a current resolution of 150 dpi.

Three floating windows are also shown in scanner software window 200 that present control tools to the user. The controls reflect adjustments made to variable resolution preview scan 204 based on the contents of the preview window. The user may use the tools presented in the floating windows to further manipulate a selected region of interest.

Exposure adjustment window 238 offers control tools that apply to all photographic output data types to preserve highlight and shadow detail. Color adjustment window 240 applies only to color photographic output data types to adjust hue and saturation. Black and white threshold window 242 applies only to black and white binary output data types such as line art, clip art, halftones, and text.

Figure 3A:
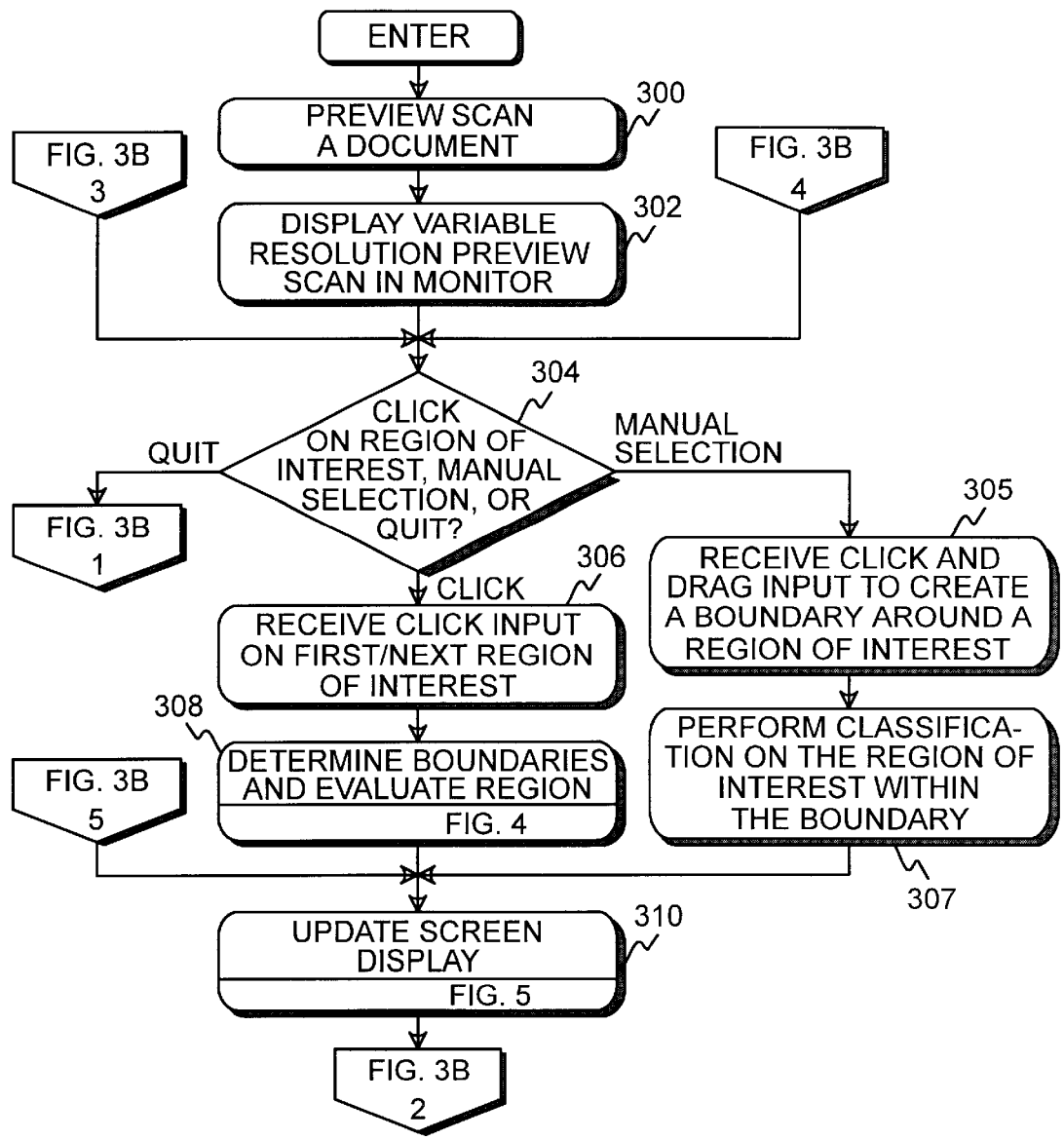
FIG. 3A and FIG. 3B show a block diagram of the overall flow of the operation of the user interface for scanner software of the present invention.
Figure 3B:
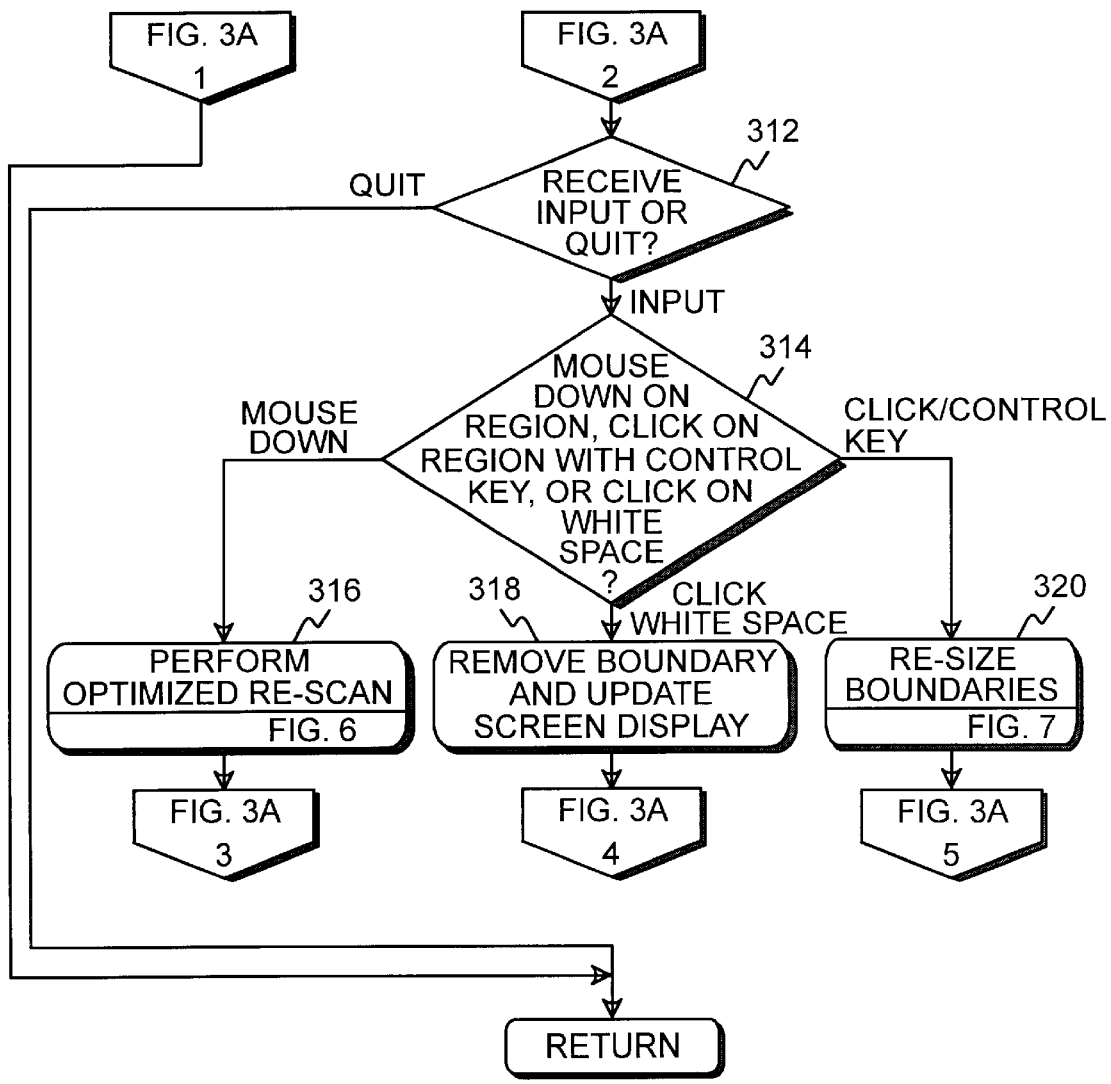

FIG. 3A and FIG. 3B show a block diagram of the overall flow of the operation of the user interface for scanner software of the present invention. The user interface is called from scanner software 124 (FIG. 1), when requested by the user of the scanner software 124. Scanner software 124 performs other scanner functions which are not part of the invention.

Referring now to FIG. 3A and FIG. 3B, after entry, in step 300 a variable resolution preview scan is initiated for a document placed in the flatbed of scanner 114 (FIG. 1) that may contain text, line art, and/or color and black and white photographic images of interest. In step 302, variable resolution preview scan 204 (FIG. 2) is displayed within variable resolution preview window 202 (FIG. 2) in monitor 110 (FIG. 1).

Step 304 determines if click input from graphical input device 108 (FIG. 1) on a region of interest within variable resolution preview scan 204 is received, or if a manual selection is made by clicking in an unselected area and dragging the mouse to create a rectangular selection area, or if an indication to quit the user interface is received. If the latter is true, FIG. 3 returns to scanner software 124. If a manual selection is made, then in step 305 the click and drag input establishing a boundary around a region of interest is received. Then in step 307 scanner software 124 performs classification analysis on the set of data elements contained within the boundary established by step 305, as more fully explained in FIG. 4.

If click input is received in step 304, then in step 306 click input on a region of interest is received by scanner software 124. Step 308 calls FIG. 4 which evaluates the region surrounding the click point to determine its boundary and its image data type. After returning from FIG. 4, step 310 then calls FIG. 5 to update the screen display of monitor 110. After returning from FIG. 5, step 312 determines if further input, or an indication to quit the user interface, is received. If the latter is true, FIG. 3 returns to scanner software 124. If the former is true, then step 314 determines what type of further input was received. If the input received was a "mouse down" input signal selecting the region of interest for a potential drag and drop from graphical input device 108, then step 316 calls FIG. 6 to potentially perform an optimized final scan of the region of interest. After returning from FIG. 6, control returns to step 304 where another region of interest may be selected, or input received to quit the user interface.

If the input determined in step 314 was click input from graphical input device 108 on white space within variable resolution preview scan 204, then in step 318 scanner software 124 removes selection marker 216 that was placed around the region of interest. This action de-selects the current image selected. All portions of variable resolution preview scan 204 that had been grayed out are restored and the display in variable resolution preview window 202 (FIG. 2) in monitor 110 is updated. Control then returns to step 304 where another region of interest may be selected, or input received to quit the user interface.

Figure 7:
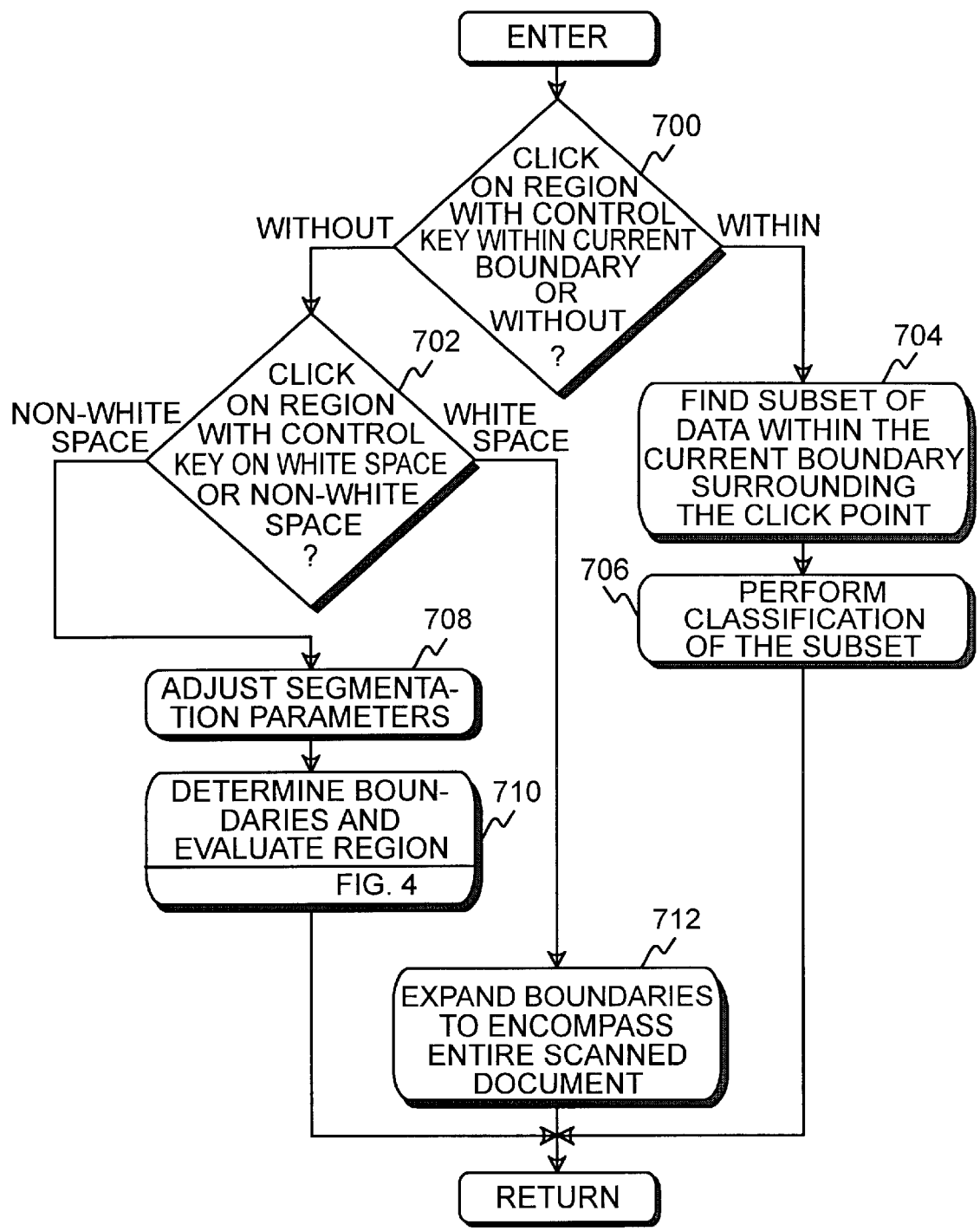
FIG. 7 shows a block diagram for re-sizing the boundary of a region of interest.

Finally, if the input determined in step 314 was click input on a region simultaneous with a control key held down, then step 320 calls FIG. 7 to re-size the boundary of the region of interest. After returning from FIG. 7, control returns to step 310, which is a call to FIG. 5 to update the screen display of monitor 110.

Figure 4:
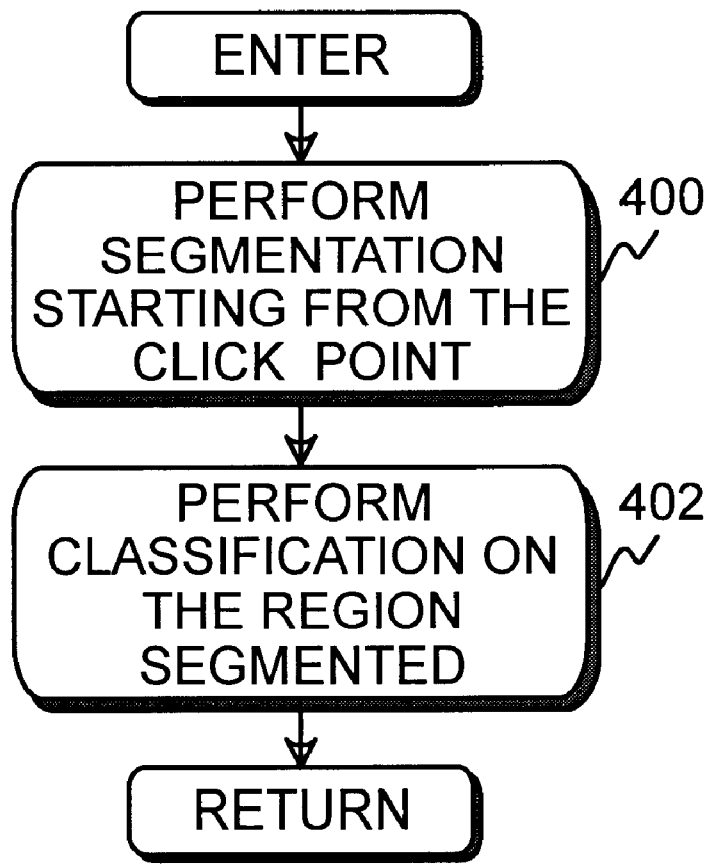
FIG. 4 shows a block diagram for determining the boundary of the region of interest and classifying the data type within the region of interest.

FIG. 4 shows a block diagram for determining the boundary of the region of interest and classifying the data type within the region of interest. Referring now to FIG. 4, after entry, scanner software 124 performs an analysis on the data elements from variable resolution preview scan 204 on the immediate region around the point clicked to determine the boundary of the region of interest and the data type within the region of interest. In step 400, segmentation analysis is performed to determine the boundary of the region of interest. Various techniques are well known in the art for performing segmentation analysis, falling into three broad categories: top down strategy (model-driven), bottom up strategy (data-driven), and hybrid. For example, see Theo Pavlidis and Jiangying Zhou, *Page Segmentation and Classification*, published in Document Image Analysis, pp 226–238, (Lawrence O'Gorman and Rangachar Kasturi, IEEE Press, 1995). Also, see Anil K. Jain and Bin Yu, *Documentation Representation and Its Application to Page Decomposition*, published in Pattern Analysis and Machine Intelligence, pp 294–308, (Volume 20, No. 3, Mar. 1998). In the preferred embodiment of the invention, a bottom up strategy is employed, utilizing the data element at the click point as the beginning of the segmentation extension analysis. However, segmentation is not performed on the entire scanned document as is typically done, but is halted after the boundary for the region of interest surrounding the click point has been determined. The region of interest contains a set of data elements from the variable resolution preview scan, and the boundary is determined by the set of connected outermost data elements.

If the region of interest is rectangular in nature, extension is performed along a linear front, resulting in a selection marker that is a rectangular bounding box. For non-rectangular "lasso" regions of interest, extension is performed along a non-linear front, resulting in a selection marker that is a "lasso" around the region of interest.

After performing segmentation analysis, in step 402 scanner software 124 performs classification analysis on the set of data elements contained within the boundary established by step 400. Various techniques, also well known in the art for performing classification analysis, are also disclosed in the two articles cited above. In the preferred embodiment of the invention, the classification method used is that disclosed in U.S. Pat. No. 5,596,655 issued to Patricia D. Lopez on Jan. 21, 1997. Upon completion of classification analysis, FIG. 4 then returns to FIG. 3A.

Figure 5:
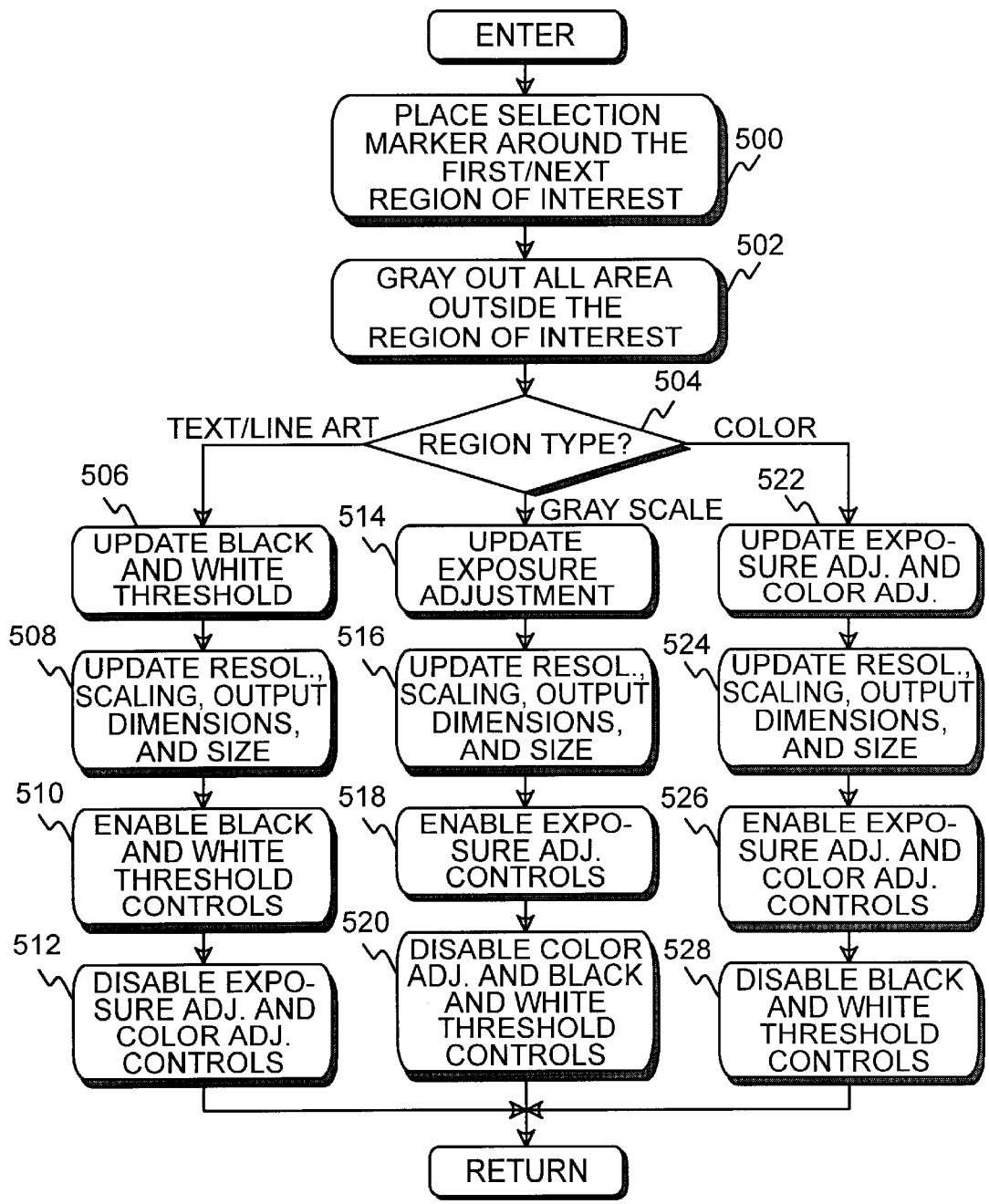
FIG. 5 shows a block diagram for updating the screen display of a computer monitor based on the selected area and its type.

FIG. 5 shows a block diagram for updating the computer monitor display based on the selected area and its data type.

Referring now to FIG. 5, in step 500 a selection marker is displayed in variable resolution preview scan 204 (FIG. 2) in monitor 110 (FIG. 1) around the region of interest determined from either FIG. 4 or from FIG. 7, which is discussed below. If a selection marker is already displayed when FIG. 5 is called, that selection marker is removed from display before displaying the next selection marker. In step 502 the remainder of variable resolution preview scan 204 lying outside of the region of interest bounded by the currently displayed selection marker is grayed out.

Step 504 determines the data type of the region of interest. If the data type in the region of interest is text or black and white line art, then control passes to step 506 where scanner software 124 updates the output in black and white threshold window 242 (FIG. 2). In step 508 scanner software 124 updates the resolution, scaling, output dimensions, and file size within status bar 222 (FIG. 2). In step 510 the controls in black and white threshold window 242 (FIG. 2) are enabled for user input. The user may make manual changes using the controls that have been enabled prior to initiating a re-scan of the selected region of interest. In step 512 the controls for exposure adjustment window 238 (FIG. 2) and color adjustment window 240 (FIG. 2) are disabled from user input, and are grayed out. Thus, the steps in steps 506, 508, 510, and 512 automatically make many of the adjustments that the user would normally have to make manually in other prior art scanning systems after selecting an image for scanning. The current invention reduces the complexity of the software and confusion of controls that the typical user may not understand. At this time, the user may also make manual changes using the controls that have been enabled prior to re-scanning the selected image.

In step 504, if the data type in the region of interest is gray scale photographic, then control passes to step 514 where scanner software 124 changes the output in exposure adjustment window 238. In step 516 scanner software 124 updates the resolution, scaling, output dimensions, and file size within status bar 222. In step 518 the controls in exposure adjustment window 238 are enabled for user input. The user may make manual changes using the controls that have been enabled prior to initiating a re-scan of the selected region of interest. In step 520 the controls in color adjustment window 240 and black and white threshold window 242 are disabled from user input and are grayed out.

In step 504, if the data type in the region of interest is color photographic, then in step 522 scanner software 124 changes the output in exposure adjustment window 238 and in color adjustment window 240. In step 524 scanner software 124 updates the resolution, scaling, output dimensions, and file size within status bar 222. In step 526 the controls in exposure adjustment window 238 and color adjustment window 240 are enabled for user input. The user may make manual changes using the controls that have been enabled prior to initiating a re-scan of the selected region of interest. In step 528 the controls in black and white threshold window 242 are disabled from user input and is grayed out. After any of steps 512, 520, or 528, FIG. 5 returns to FIG. 3.

Thus, the steps in steps 506, 508, 510, and 512; steps 514, 516, 518, and 520; and steps 522, 524, 526, and 528, automatically make many of the adjustments that the user would normally have to make manually in other prior art scanning systems after selecting a region of interest for scanning. The current invention reduces the complexity of the software user interface and confusion of controls that the typical user may not understand.

Figure 6:
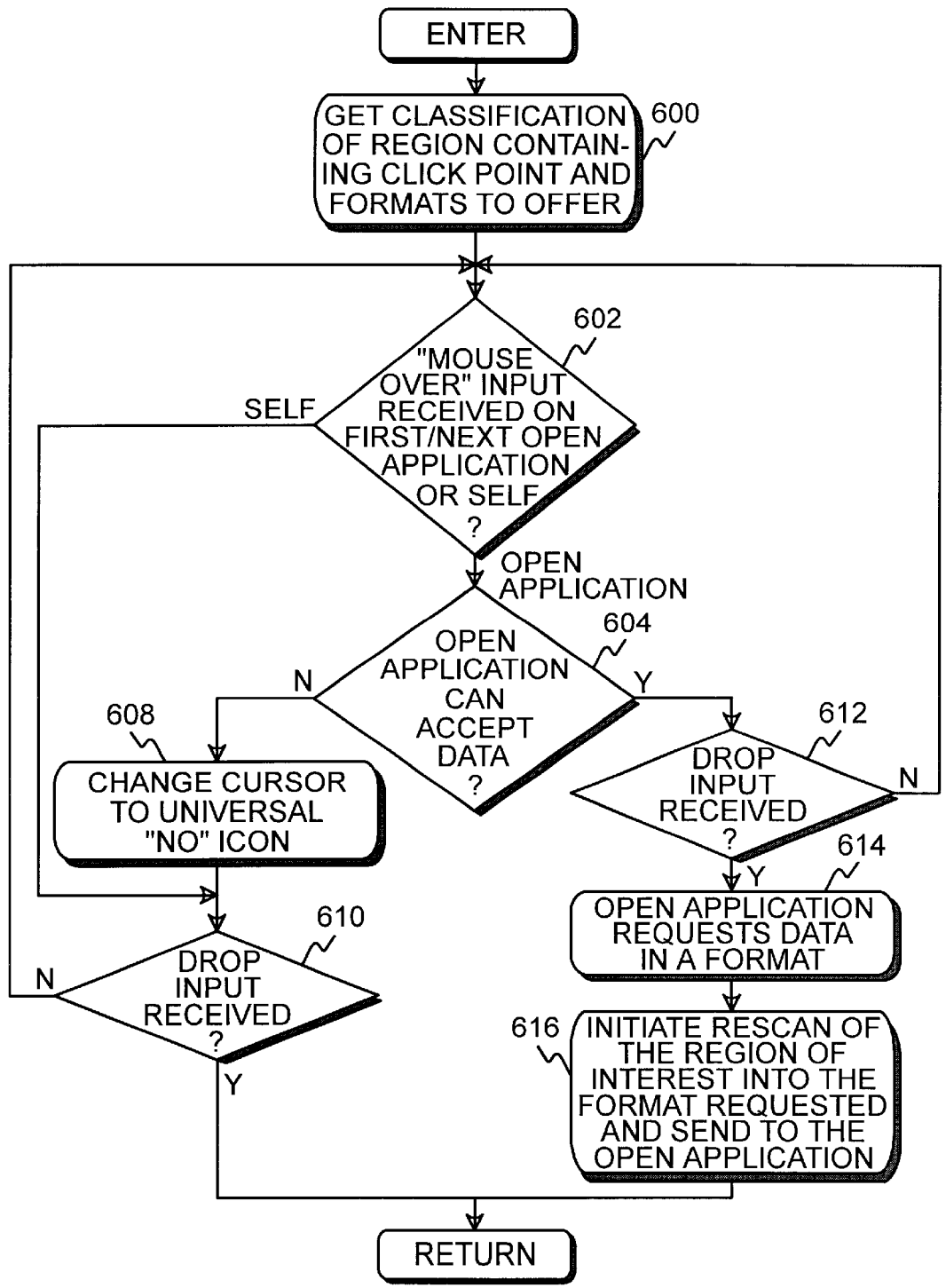
FIG. 6 shows a block diagram for performing an optimized final scan of the region of interest utilizing the drag and drop feature from the Windows operating system.

FIG. 6 shows a block diagram for performing an optimized final scan of the selected region utilizing the drag and drop feature from the Windows operating system. Referring now to FIG. 6, in step 600, a data object is created and a list of one or more predetermined data formats provided in scanner software 124 is loaded into memory, based on the "mouse down" input signal selecting the region of interest displayed in monitor 110 (FIG. 1) whose data type, or classification, was determined in FIG. 4. In the preferred embodiment of the invention, for image types, such as true color, gray scale, palette, and black and white binary, a $CF_{13}$ DIB format is provided, which is a Windows Device Independent Bitmap, and a private drag/drop information format. For metafile types, such as black and white scalable (vector), a $CF_{13}$ METAFILEPICT format is provided, which is a Windows Metafitle Clipboard format, and a private drag/drop information format. For text, a $CF_{13}$ TEXT, which is ASCII Text, a $CF_{13}$ RTF, which is Rich Text Format, and a private drag/drop information format are provided. The private drag/drop information format is for internal use by scanner software 124 (FIG. 1), mainly as information for drawing feedback when the pointer 214 is moved over scanner software window 200 (FIG. 2).

In addition, two other data formats are provided for all data types when dragging and dropping to the desktop or to a folder. These two data formats, $CFSTR_{13}$ FILEDESCRIPTOR and $CFSTR_{13}$ FILECONTENTS are used by Explorer to create a file that will reside on the desktop or in a folder. The user must hold down a control key when the drag operation is initiated in order to add these data formats to the list of formats available to Explorer for a drop to the desktop or to a folder.

Step 602 determines if a "mouse over" input signal from graphical input device 108, which is handled by operating system 120 (FIG. 1) from a call made by scanner software 124, is received identifying an open application in monitor 110, or identifying scanner software window 200 itself If the "mouse over" input signal is received identifying scanner software window 200, control passes to step 610. Step. 610 then determines if a "mouse drop" input signal is received from graphical input device 108 selecting scanner software window 200 displayed in monitor 110. This indicates that the user decided not to initiate an optimized final scan. If the answer is yes, then FIG. 6 returns to FIG. 3. If the answer in step 610 is no, indicating no "mouse drop" signal was received, or that pointer 214 left scanner software window 200, then control returns to step 602.

If the "mouse over" input signal in step 602 is received identifying an open application, which was opened by a call to the software application, such as first software application 126 (FIG. 1), then operating system 120 notifies first software application 126 that pointer 214 has entered its window. Then in step 604 first software application 126 queries the list of predetermined data formats associated with the data object created in step 600. If one or more acceptable formats are found in the list generated in step 600, then first software application 126 lets operating system 120 know that it can receive the data and indicates a preferred format from the one or more acceptable formats. Step 612 then determines if a "mouse drop" input signal from graphical input device 108 is received, selecting first software application 126. If the answer is no, indicating no "mouse drop" signal was received, or that pointer 214 has left the first software application 126 window, then control returns to step 602. If the answer in step 612 is yes, indicating that a "mouse drop" input signal was received, then in step 614 first software application 126 makes a call to operating system 120 and requests the image data in the format it prefers. Then, in step 616, scanner software 124 sends a command to scanner 114 (FIG. 1) launching an optimized final scan of the document, and the image data from the optimized final scan is put into the format requested. The image data output from the optimized final scan for the region of interest portion of the document is sent to first software application 126, where the image data resides in the selected data format for further manipulation by the user within first software application 126. Control then returns to FIG. 3.

If in step 604 first software application 126 cannot find a format for the data that it can accept from the list generated in step 600, then step 608 changes the displayed pointer 214 to the universal "no" icon, a circle with a diagonal slash through it, indicating that a drop of the data object will not be allowed. Step 610 then determines if a "mouse drop" input signal is received from graphical input device 108 on first software application 126. If the answer is yes, then FIG. 6 returns to FIG. 3. If the answer in step 610 is no, then control returns to step 602.

FIG. 7 shows a block diagram for re-sizing the boundary of a selected area. Referring now to FIG. 7, step 700 determines if the click input with graphical input device 108, simultaneous with a control key held down, was received within, or outside of, selection marker 216 (FIG. 2). If the click input was within selection marker 216, indicating that the user wants a smaller area than what was automatically generated in FIG. 4, then step 704 finds a subset of the data elements within selection marker 216 immediately surrounding the click point, and establishes a new, smaller boundary around the subset of data elements. Then, in step 706, scanner software 124 performs classification analysis on the subset of data elements contained within the new boundary established by step 704. FIG. 7 then returns to FIG. 3.

If in step 700 the click input with graphical input device 108, simultaneous with a control key held down, was received outside of selection marker 216, indicating that the user wants a larger area than what was automatically generated in FIG. 4, control passes to step 702. Step 702 determines if the click input with graphical input device 108, simultaneous with a control key held down, was on white space or non-white space. If the click input was on white space, then step 712 expands the boundary to encompass the entire scanned document. FIG. 7 then returns to FIG. 3.

If the click input in step 702 was on non-white space, then step 708 makes an adjustment to the parameters used in the segmentation analysis. Then step 710 calls FIG. 4 to evaluate the data elements surrounding the click point with the new parameters to determine a superset of data elements and a new boundary, and to determine the data type of the superset of data elements within the new boundary. After returning from FIG. 4, FIG. 7 then returns to FIG. 3.

Figure 8A:
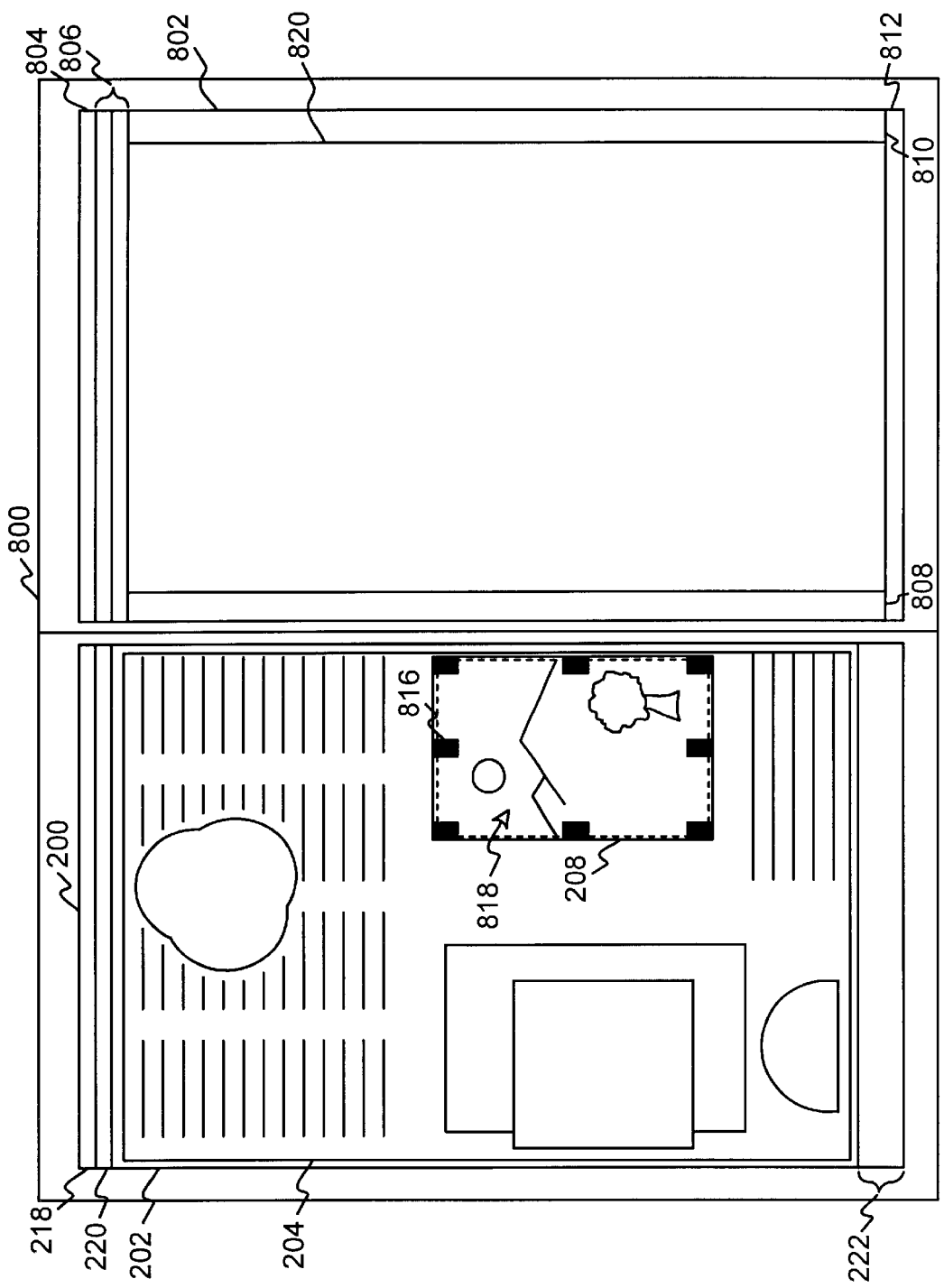
FIG. 8A and FIG. 8B show a representation of the screen display of a computer monitor showing a screen capture of the user interface for scanner software of the present invention and an open application receiving a scanned image by way of drag and drop input.
Figure 8B:
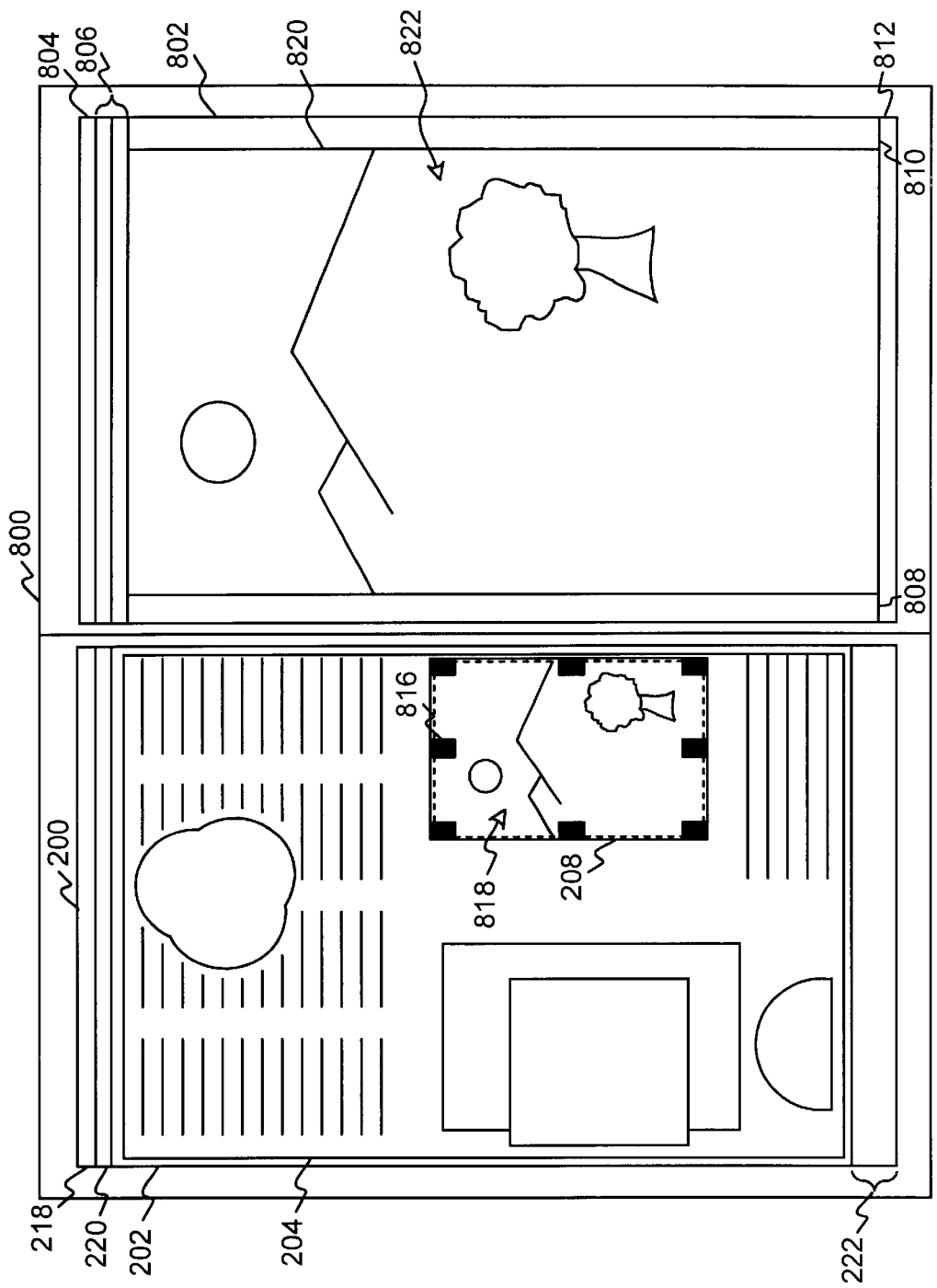

FIG. 8A and FIG. 8B show a representation of the screen display of a computer monitor showing a screen capture of the user interface for scanner software of the present invention and an open application receiving a scanned image by way of drag and drop input. Referring now to FIGS. 8A and 8B, screen display 800 has scanner software window 200 (also shown in FIG. 2) and application software window 802 displayed. Variable resolution preview scan 204 is displayed within variable resolution preview window 202 (also shown in FIG. 2). Black and white line art region 208 (also shown in FIG. 2) has been selected by a user with graphical input device 108 (FIG. 1) by moving pointer 214 (FIG. 2) to a point within black and white line art region 208, and clicking graphical input device 108, causing selection marker 816 to be displayed around black and white line art region 208. Black and white line art region 208 contains black and white line art image 818.

Status bar 222 (also shown in FIG. 2) is updated to display current information regarding black and white line art region 208. The three dialog boxes normally displayed in scanner software window 200 adjacent to variable resolution preview window 202 have been closed down by the user to create room in screen display 800 for application software window 802.

First software application 126 (FIG. 1) is loaded into memory 118 (FIG. 1) and is displayed in application software window 802, which contains open work area 820. First software application 126 may be a word processing application, a spread sheet application, or a photo image editing type application that the user would like to bring a scanned version of black and white line art image 818 into. To accomplish this, the user moves pointer 214 (not shown in FIGS. 8A and 8B) with graphical input device 108 to a point within black and white line art region 208. The user then performs a drag and drop maneuver by holding down the graphical input device button, moving graphical input device 108 such that pointer 214 travels from the point within black and white line art region 208 displayed on monitor 110 that the "mouse down" input signal was sent, to any point within open work area 820 within application software window 802, and then releasing the graphical input device button to send the mouse drop input signal selecting the open application. This drag and drop maneuver onto open work area 820 initiates within scanner software 124 (FIG. 1) an optimized final scan of the document, which generates image data. When the optimized final scan is completed, the image data is sent from scanner 114 to firsts software application 126, where the image data appears as scanned image 822 in FIG. 8B. The image data fully resides within the application software. The user may then further manipulate scanned image 822 and/or save the image data to a file.

If the user selects a text region in variable resolution preview scan 204 to drag and drop to application software window 802, the text region is scanned utilizing the automatic adjustments and updates made by scanner software 124 after the text region was selected. OCR, Optical Character Recognition, is then performed. The resulting data is put into ASCII Text format or Rich Text Format for delivery to the open application.

Figure 9A:
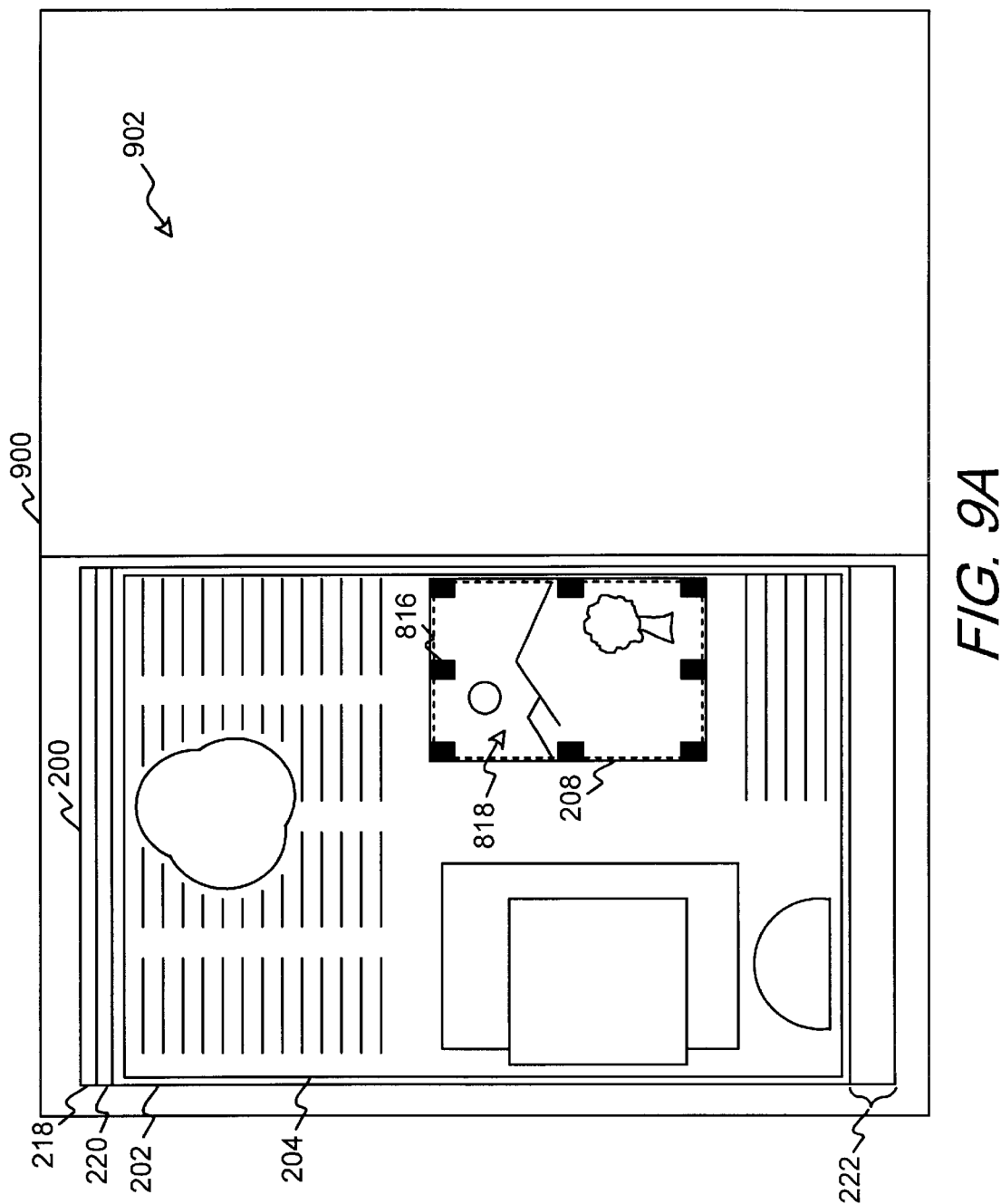
FIG. 9A and FIG. 9B show a representation of the screen display of a computer monitor showing a screen capture of the user interface for scanner software of the present invention and a desktop receiving a scanned image by way of drag and drop input.
Figure 9B:
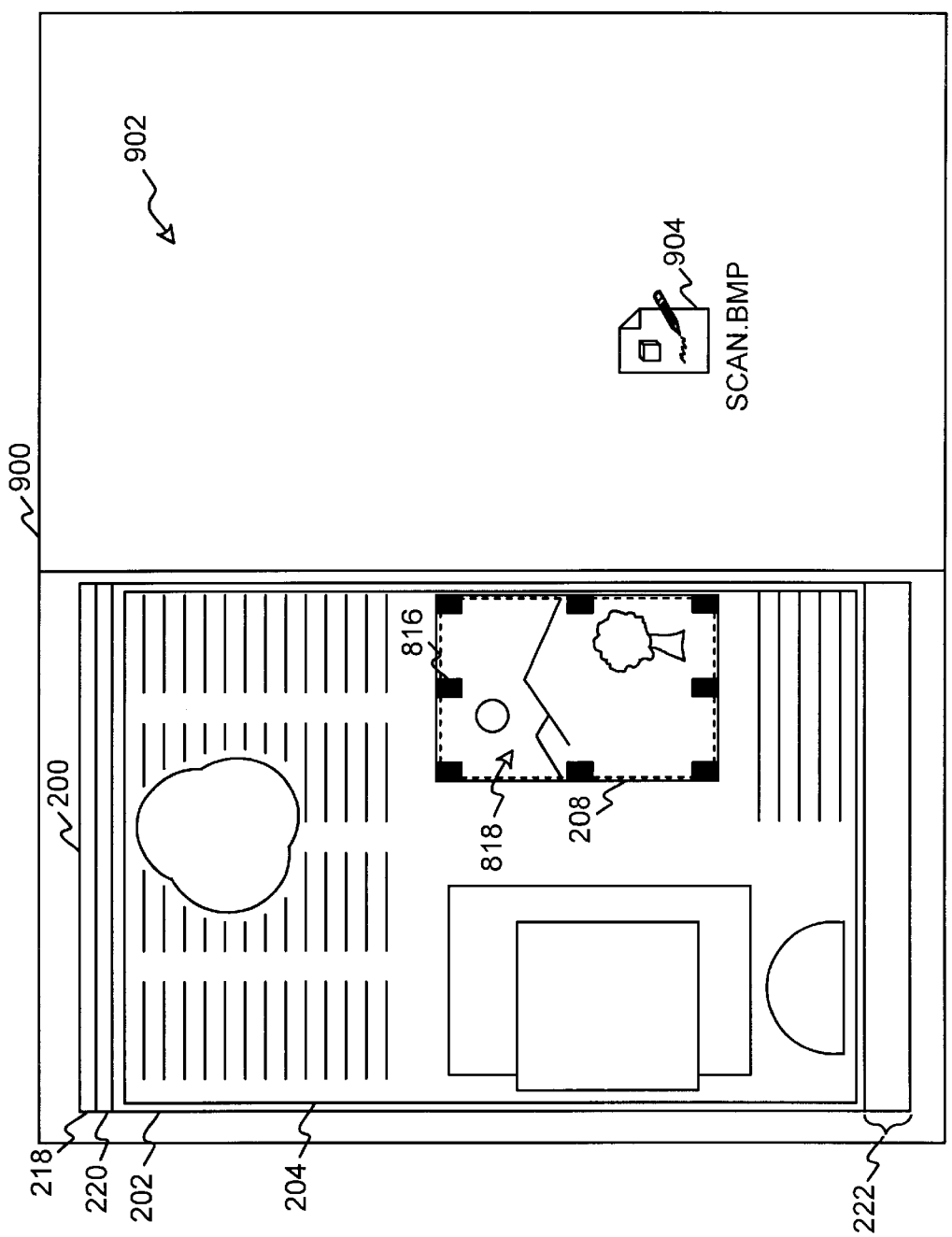

FIG. 9A and FIG. 9B show a representation of the screen display of a computer monitor showing a screen capture of the user interface for scanner software of the present invention and a desktop receiving a scanned image using the drag and drop feature of the Windows operating system. Referring now to FIGS. 9A and 9B, screen display 900 has scanner software window 200 (also shown in FIG. 2) and desktop area 902 displayed. Variable resolution preview scan 204 is displayed within variable resolution preview window 202 (also shown in FIG. 2). Black and white line art region 208 (also shown in FIG. 2) has been selected by a user with graphical input device 108 (FIG. 1) by moving pointer 214 (FIG. 2) to a point within black and white line art region 208, and clicking graphical input device 108, causing selection marker 816 to be displayed around black and white line art region 208. Black and white line art region 208 contains black and white line art image 818.

Status bar 222 (also shown in FIG. 2) is updated to display current information regarding black and white line art region 208. The three floating windows normally displayed in scanner software window 200 adjacent to variable resolution preview window 202 have been closed down by the user to create room in screen display 900 for desktop area 902.

The user may bring a scanned version of black and white line art image 818 onto desktop area 902. To accomplish this, the user moves pointer 214 with graphical input device 108 to a point within black and white line art region 208. The user then performs a drag and drop maneuver. A control key must be held down when the drag operation is initiated to add the data formats to the list of formats available to Explorer for a drop to the desktop or to a folder. The graphical input device button is held down, then graphical input device 108 is moved such that pointer 214 (not shown in FIG. 9A or 9B) travels from the "mouse down" point within black and white line art region 208 to any point within desktop area 902, and then the graphical input device button is released, completing the drag and drop maneuver. This same procedure may be applied to bring a scanned version of black and white line art image 818 to a writeable folder within a directory window. This drag and drop maneuver onto desktop area 902, or onto a writeable folder within a directory window (not shown in FIGS. 9A and 9B) initiates within scanner software 124 (FIG. 1) an optimized final scan of the document, which generates image data. When the optimized final scan is completed, the image data is sent form scanner 114 to the desktop, which is an open application, where the image data appears in FIG. 8B as scan.bmp icon 904, representing a file created by Explorer, the file manager software in Windows, upon receiving the image data from scanner 114. The same icon would appear for a drop to a writeable folder within a directory window. The user may then further manipulate the image with a software application that can accept .bmp file formats.

If the user selects a text region in variable resolution preview scan 204 to drag and drop to desktop area 902, the text region is scanned utilizing the automatic adjustments and updates made by scanner software 124 after the text region was selected. OCR, Optical Character Recognition, is then performed. The resulting data is put into ASCII Text format for delivery to desktop area 902. A text file is created by Explorer, the file manager software in Microsoft Windows®, upon receiving the image data from scanner software 124, and the file appears as an icon in open work area 820, which may be opened by Notepad or whatever other comparable software has been set up by the user.

Having described a presently preferred embodiment of the present invention, it will be understood by those skilled in the art that many changes in construction and circuitry and widely differing embodiments and applications of the invention will suggest themselves without departing from the scope of the present invention, as defined in the claims. The disclosures and the description herein are intended to be illustrative and are not in any sense limiting of the invention, defined in scope by the following claims.

What is claimed is:

1. A user interface method, within a computer system, for transferring image data from scanner software to a software application, said method comprising:
   (a) launching a preview scan of a document creating preview scan data of said document;
   (b) displaying said preview scan data on a monitor connected to said computer system;
   (c) selecting a region of interest from said preview scan data displayed on said monitor, wherein step (c) further comprises steps (c1) and (c2);
      (c1) receiving a data type for said selected region of interest in said memory in said computer system; and
      (c2) retrieving at least one data format associated with said data type for said selected region of interest;
   (d) receiving, into said memory in said computer system, an input signal, wherein said input signal selects said software application, and further wherein said software application was previously loaded into said memory in said computer system, wherein step (d) further comprises the following steps (d0a) through (d0c);
      (d0a) receiving a signal from said software application displayed on said monitor indicating that said software application requests data formats available;
      (d0b) supplying at least one data format for said scanned data to said software application; and
      (d0c) receiving a selected data format, said selected format being selected from said at least one data format by said software application;
   (e) launching, with said scanner software, a final scan of said document creating said image data, wherein said image data of said document corresponds to said selected region of interest;
   (f) receiving said image data in said memory in said computer system; and
   (g) sending said image data to said selected software application.

2. A user interface method, within a computer system, for transferring data from scanner software to a software application according to claim 1 wherein step (a) further comprises step (a0) performed before step (a), and step (e) further comprises step (e1):
   (a0) placing said document into a position to be scanned by a scanner connected to said computer system; and
   (e1) receiving in said scanner, from said scanner software, a command to launch said final scan of said document, wherein said final scan creates said image data.

3. A user interface method, within a computer system, for transferring data from scanner software to a software application according to claim 1 wherein when said data type for said selected region of interest is true color, gray scale, palette, or black and white binary, said data format is a Windows Device Independent Bitmap format.

4. A user interface method, within a computer system, for transferring data from scanner software to a software application according to claim 1 wherein when said data type for said selected region of interest is black and white scalable vector, said data format is a Windows Metafile Clipboard format.

5. A user interface method, within a computer system, for transferring data from scanner software to a software application according to claim 1 wherein when said data type for said selected region of interest is text, said data format is an ASCII Text format or a Rich Text format.

6. A user interface method, within a computer system, for transferring data from scanner software to a software application according to claim 1 wherein step (d) further comprises step (d0d) performed after step (d0c), and step (f) further comprises step (f0) performed before step (f):
   (d0d) requesting, by said software application, that said image data be formatted into said selected data format; and
   (f0) formatting said image data into said selected data format.

7. A user interface method, within a computer system, for transferring data from scanner software to a software application according to claim 1 wherein step (d0b) further comprises the following step (d0b1):
   (d0b1) displaying, in said open application window on said monitor when said software application cannot accept one of said at least one data format supplied to said software application, a universal "no" icon in place of a pointer icon.

8. A user interface method, within a computer system, for transferring data from scanner software to a software application according to claim 1 further comprising the steps of:
   (h) receiving said image data in said selected software application in said memory; and
   (i) displaying said image data in said open application window on said monitor.

9. A user interface method, within a computer system for transferring data from scanner software to a software application according to claim 8 wherein said software application is a desktop.

10. A user interface method, within a computer system, for transferring data from scanner software to a software application according to claim 9 wherein step (h) further comprises steps (h1) through (h3):
   (h1) creating a file, by file manager software within an operating system loaded into said memory, upon receiving said image data into said memory, wherein a file type of said file is determined based on said data type;
   (h2) saving said file as said file type in said computer system; and
   (h3) displaying a representation of said file of said file type as an icon on said desktop.

11. A user interface method, within a computer system, for transferring data from scanner software to a software application according to claim 8 wherein said software application is a writeable folder.

12. A user interface method, within a computer system, for transferring data from scanner software to a software application according to claim 11 wherein step (h) further comprises steps (h1) through (h3):
   (h1) creating a file, by file manager software within an operating system loaded into said memory, upon receiving said image data into said memory, wherein a type of said file is determined based on said data type;
   (h2) saving said file as said file type in said computer system; and
   (h3) displaying a representation of said file as an icon on said writeable folder.

13. A system for transferring data from scanner software to a software application, said system comprising:
   a scanner device, connected to a computer system, for scanning a document and for generating preview scan data of said document;
   a monitor, connected to said computer system, wherein said monitor displays said preview scan data of said document in a scanner window, and for displaying an open application window;
   a graphical input device, connected to said computer system, for selecting a region of interest from said preview scan data displayed in said scanner window;
   an operating system, operating within a memory within said computer system, for receiving a mouse down input signal from said graphical input device to select said selected region of interest, for receiving a mouse over input signal from said graphical input device to identify a software application loaded into said memory and displayed in said open application window, and for receiving a mouse drop input signal from said graphical input device to select said software application;
   and scanner software, operating within said memory, within said computer system, for displaying said selected region of interest within said preview scan data of said document in said scanner window, for launching a final scan of said document in said scanner device after said mouse drop input signal is received selecting said software application, and for transferring data from said final scan to said software application;
   wherein, after said operating system receives said mouse over input identifying said software application running within said open application window, said software application queries said scanner software to determine if said scanner software offers at least one data format associated with said data type of said selected region of interest, wherein said software application can accept drop input of said data type in one of said at least one data formats.

14. A system for transferring data from scanner software to a software application according to claim 13 wherein said software application, after performing said query, requests one of said at least one data formats, and said scanner software, after completing said optimized final scan, formats image data from said optimized final scan into said one of said at least one data formats.

15. A system for transferring data from scanner software to a software application according to claim 14 wherein, when said scanner software completes said optimized final scan, said image data from said optimized final scan formatted into said one of said at least one data format is transferred from said scanner software to said software application, wherein said image data in said one of said at least one data format resides within said software application.

16. A system for transferring data from scanner software to a software application according to claim 15 wherein said image data in said one of said at least one data formats is displayed in said open application window.

17. A system for transferring data from scanner software to a software application according to claim 13 wherein said open application window is a desktop window.

18. A system for transferring data from scanner software to a software application according to claim 17 wherein after receiving said image data in said desktop window, file manager software within an operating system loaded into said memory creates a file, wherein a type of said file is determined based upon said data type, and further wherein said file is displayed as an icon in said desktop window.

19. A system for transferring data from scanner software to a software application according to claim 13 wherein said open application window is a directory window having at least one writeable folder.

20. A system for transferring data from scanner software to a software application document according to claim 17 wherein after receiving said image data in said at least one writeable folder in said directory window, file manager software within an operating system loaded into said memory creates a file, wherein a type of said file is determined based upon said data type, and further wherein said file is displayed as an icon in said writeable folder in said directory window.

* * * * *